United States Patent
Zhang (10) Patent No.: US 12,032,429 B2
(45) Date of Patent: Jul. 9, 2024

(54) APPLICATION PROGRAM FREEZING CONTROL METHOD AND APPARATUS, TERMINAL, AND READABLE STORAGE MEDIUM

(71) Applicant: XI'AN ZHONGXING NEW SOFTWARE CO., LTD., Xi'an (CN)

(72) Inventor: Jiahao Zhang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 84 days.

(21) Appl. No.: 17/622,004

(22) PCT Filed: May 27, 2020

(86) PCT No.: PCT/CN2020/092461
§ 371 (c)(1),
(2) Date: Dec. 22, 2021

(87) PCT Pub. No.: WO2021/000666
PCT Pub. Date: Jan. 7, 2021

(65) Prior Publication Data
US 2022/0269328 A1 Aug. 25, 2022

(30) Foreign Application Priority Data
Jul. 2, 2019 (CN) .......................... 201910591542.3

(51) Int. Cl.
*G06F 1/329* (2019.01)
*G06F 1/3234* (2019.01)

(52) U.S. Cl.
CPC ............ *G06F 1/329* (2013.01); *G06F 1/3234* (2013.01)

(58) Field of Classification Search
CPC ....... G06F 1/329; G06F 1/3234; G06F 9/4418
See application file for complete search history.

(56) References Cited

U.S. PATENT DOCUMENTS

10,817,307 B1 * 10/2020 De La Cropte De Chanterac ...... G06F 1/3212
2010/0174928 A1 * 7/2010 Borghetti .............. G06F 1/3203 713/320

(Continued)

FOREIGN PATENT DOCUMENTS

CN 106126295 A 11/2016
CN 106292998 A * 1/2017
(Continued)

OTHER PUBLICATIONS

European Patent Office. Extended European Search Report for EP Application No. 20835286.4, dated Sep. 30, 2022, pp. 1-23.

(Continued)

*Primary Examiner* — Jaweed A Abbaszadeh
*Assistant Examiner* — Cheri L Harrington
(74) *Attorney, Agent, or Firm* — Vivacqua Crane, PLLC (57) ABSTRACT

An application freezing control method and device, a terminal device (1000), and a non-transitory computer-readable storage medium are disclosed. The application freezing control method may include: unfreezing, in response to a basic unfreezing moment in a basic freezing control period being reached, an application which is in a frozen state and meets an unfreezing condition (S101); and freezing, in response to a basic freezing moment in the basic freezing control period being reached, an application which is in an unfrozen state and meets a freezing condition (S102).

18 Claims, 6 Drawing Sheets

(56) References Cited

U.S. PATENT DOCUMENTS

| | | | | |
|---|---|---|---|---|
| 2011/0249668 | A1* | 10/2011 | Van Milligan | G06F 9/542 |
| | | | | 370/352 |
| 2014/0006809 | A1* | 1/2014 | Udeshi | G06F 9/4893 |
| | | | | 713/300 |
| 2014/0359102 | A1 | 12/2014 | Kihara et al. | |
| 2015/0198996 | A1* | 7/2015 | Kliegman | G06F 1/3287 |
| | | | | 713/300 |
| 2019/0171831 | A1* | 6/2019 | Xin | G06F 21/32 |
| 2020/0241917 | A1* | 7/2020 | Chen | G06F 18/2113 |
| 2021/0357252 | A1* | 11/2021 | Hu | G06F 1/3228 |

FOREIGN PATENT DOCUMENTS

| | | |
|---|---|---|
| CN | 107957771 A | 4/2018 |
| CN | 108055693 A | 5/2018 |
| CN | 108616662 A | 10/2018 |
| CN | 109388487 A | 2/2019 |
| EP | 3416025 A1 | 12/2018 |
| WO | 2015184885 A1 | 12/2015 |

OTHER PUBLICATIONS

International Searching Authority. International Search Report and Written Opinion for PCT Application No. PCT/CN2020/092461 and English translation, dated Aug. 26, 2020, pp. 1-11.

The State Intellectual Property Office of People's Republic of China. First Office Action for CN Application No. 2019105915423 and English translation, dated Jul. 7, 2023, pp. 1-6.

The State Intellectual Property Office of People's Republic of China. First Search Report for CN Application No. 2019105915423 and English translation, dated Jul. 6, 2023, pp. 1-5.

* cited by examiner

APPLICATION PROGRAM FREEZING CONTROL METHOD AND APPARATUS, TERMINAL, AND READABLE STORAGE MEDIUM

CROSS-REFERENCE TO RELATED APPLICATION

This application is a national stage filing under 35 U.S.C. § 371 of international application number PCT/CN2020/092461, filed on May 27, 2020, which claims priority to Chinese patent application No. 201910591542.3 filed on Jul. 2, 2019. The contents of these applications are incorporated herein by reference in their entirety.

TECHNICAL FIELD

The present disclosure relates to the field of terminal devices, for example, to an application program (hereinafter referred to as application for short) freezing control method and device, a terminal device and a non-transitory computer-readable storage medium.

BACKGROUND

With more and more applications being available to terminal devices, the functions of the applications are becoming more and more abundant and powerful, and users usually install many applications in their terminal devices. This inevitably leads to a large number of programs running in the background which will occupy a lot of terminal device resources, thus affecting the terminal device performance and battery life. In this regard, there are many energy-saving control technologies used to control applications running in the background to improve terminal device performance and battery life, and freezing technology is one of them. The freezing technology reduces power consumption by limiting an application's access to system resources. When the user is to resume the application, the application can be simply moved from the background to the foreground of the terminal device. In this way, the application does not need to be reopened for running, thus saving loading time of the application.

In the existing technology, once an application is frozen, it will be frozen in the background for a long time if the frozen application has never been reactivated up by the user or been woken up by a broadcast or data service. Although this scheme can effectively prevent the background applications from consuming power, all background activities of a frozen applications cannot be executed during this period, for example, a pedometer application cannot update the number of steps, and a message push application cannot acquire information from a server in time, which will affect the user experience; while without freezing these applications, there is a possibility of high power consumption due to frequent activities of these applications.

SUMMARY

The present disclosure provides an application freezing control method and device, a terminal device and a non-transitory computer-readable storage medium, which solve the problem that the existing freezing control technologies cannot achieve a balance between energy saving and normal execution of application functions to at least a certain extent.

An embodiment of the present disclosure provides an application freezing control method, which may include: unfreezing, in response to a basic unfreezing moment in a basic freezing control period being reached, an application which is in a frozen state and meets an unfreezing condition; and freezing, in response to a basic freezing moment in the basic freezing control period being reached, an application which is in an unfrozen state and meets a freezing condition.

An embodiment of the present disclosure further provides an application freezing control device, which may include: a control module configured to unfreeze, in response to a basic unfreezing moment in a basic freezing control period being reached, an application which is in a frozen state and meets an unfreezing condition; and freeze, in response to a basic freezing moment in the basic freezing control period being reached, an application which is in an unfrozen state and meets a freezing condition.

An embodiment of the present disclosure further provides a terminal device, which may include a processor, a memory and a communication bus, where the communication bus is configured to connect the processor and the memory; and the processor is configured to execute a computer program stored in the memory to implement the application freezing control method as described above.

An embodiment of the present disclosure further provides a non-transitory computer-readable storage medium storing one or more computer programs executable by one or more processors to implement the application freezing control method as described above.

DETAILED DESCRIPTION

The embodiments of the present disclosure will be illustrated below through detailed description in conjunction with the accompanying drawings. The particular embodiments described herein are only intended to explain the present disclosure, and are not intended to limit the present disclosure.

In the following embodiments of the present disclosure, a terminal device may be a mobile phone, a tablet computer, a laptop computer, a hand-held computer, a smart television, a mobile Internet device, a wearable device, or other terminal device on which an application client may be installed, or any other terminal device or device that may implement the application processing method of the present invention, which is not limited by the present disclosure.

EMBODIMENT I

Figure 1:
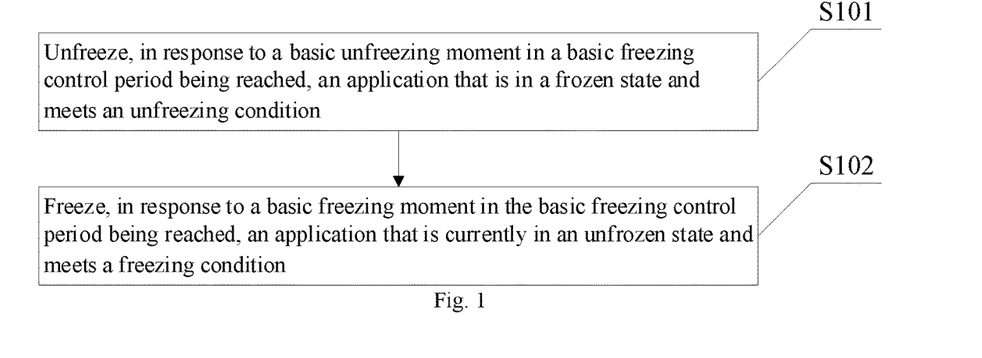
FIG. 1 is a flowchart of an application freezing control method provided in embodiment I of the present disclosure.

This embodiment provides an application freezing control method, which, by setting a basic freezing control period, dynamically controls frozen applications between unfreezing and freezing based on the set basic freezing control period, thereby achieving a reasonable balance between energy saving and normal execution of application functions. This embodiment will be illustrated below with the flow of the application freezing control method shown in FIG. 1 as an example, as shown in FIG. 1, including the following steps.

At S101, in response to a basic unfreezing moment in a basic freezing control period being reached, an application which is currently in a frozen state and meets an unfreezing condition is unfrozen.

At S102, in response to a basic freezing moment in the basic freezing control period being reached, an application which is currently in an unfrozen state and meets a freezing condition is frozen.

In some examples of this embodiment, the freezing condition includes: the application being not an application in a freezing protection database, and the application being currently in a background running state, where the freezing protection database stores applications which do not require freezing processing. The applications in the freezing protection database may also be flexibly set or updated according to requirements.

The basic freezing control period set in this embodiment is configured for periodic control of the applications in a cyclic manner. The basic freezing control period in this embodiment includes a basic unfreezing moment and a basic freezing moment, where the time period between the basic unfreezing moment and the basic freezing moment in a basic freezing control period constitutes an unfreezing window; and the time period between the basic freezing moment in a basic freezing control period and the basic unfreezing moment in the next basic freezing control period constitutes a freezing window.

The freezing control object in this embodiment includes applications currently running in the terminal device. For example, in some examples, freezing control processing may only be performed on applications currently running in the background. In some other examples, the freezing control processing may be performed on both applications currently running in the background and applications running in the foreground.

In this embodiment, the basic freezing control period may be flexibly set according to, but is not limited to, the requirements of applications. Alternatively, the value of the basic freezing control period in this embodiment may also support dynamic updating, for example, according to, but not limited to, at least one of the current terminal device battery level, the terminal device screen state, the terminal device network environment or the terminal device charging state, it may be determined whether to dynamically adjust the basic freezing control period. The basic freezing control period in this embodiment may be the minimum unit of control period.

In this embodiment, after unfreezing the application which is currently in the frozen state and meets the unfreezing condition, the unfrozen application may continue to perform its corresponding functions, thus avoiding the situation where all background activities of the frozen application cannot be executed because it is frozen for a long time.

In this embodiment, the unfreezing condition for frozen applications may also be set flexibly. For example, in some examples, the unfreezing condition may be set according to the type of the frozen application, and when the type of the frozen application belongs to a set unfreezing type, it may be considered as meeting the unfreezing condition. For example, in some application scenarios, the unfreezing type includes a regularly active type, that is, an application that needs to be active in the background on a regular basis, such as, but not limited to, a navigation application, a message push application, a pedometer application, a mailbox application, and the like. In this application scenario, in response to the basic unfreezing moment in the basic freezing control period being reached, it is determined whether there are currently frozen applications, and if so, it is determined whether there is a frozen application among the frozen applications which is a frozen application of the regularly active type; if so, the frozen application of the regularly active type is unfrozen.

The unfreezing condition is not limited to the condition in the above example, but may be flexibly set according to application scenarios. Further, in some examples, the unfreezing condition may support, but not limited to, setting and/or updating by at least one of service providers, terminal device providers and terminal device users.

For another example, in other examples of this embodiment, an application freezing period may also be set for the application, which is used to characterize the length of time the application needs to be in the freezing period when it is frozen. In this example, the unfreezing condition may be set based on the application freezing period of the application. For example, the unfreezing condition may include: the time difference between the currently reached basic unfreezing moment and the latest unfreezing moment for the application is greater than or equal to the application freezing period of the application, where the latest unfreezing moment for the application is the moment of the last unfreezing of the application. Further, in some application scenarios, the moment of the last unfreezing of the application may be the moment when the application was unfrozen in the cyclic control process according to the basic freezing control period, that is, the last moment when it met the unfreezing condition and got unfrozen upon the arrival of the basic unfreezing moment. In other application scenarios, the moment when an application was last unfrozen may also include the moment when the frozen application was unfrozen due to broadcast and business data wakeup.

In some examples of this embodiment, an application management database may be set, which may be used to store application management entries respectively corresponding to multiple applications. Further, in this example, a corresponding application management entry may be created in the application management database for an application upon installation of the application in the terminal device; or a corresponding application management entry may be created in the application management database for an application in response to detecting that the application is being started up on the terminal device. In addition, the contents included in the application management entries in this embodiment may also be flexibly set according to requirements. For example, in some application scenarios, the application management entry for an application may include the unique identification information for the application, the application freezing period of the application, the latest unfreezing moment for the application, etc. In some application scenarios, the application management entry may also include application running statistics information, which may be used to record at least one of the power consumption of the running of the application, whether it is running in the foreground or the background, or whether it is in the frozen state, etc. For example, in an application scenario, an application management entry is set in the application management database for an application in response to detecting that the application is being started up and has no corresponding application management entry in the application management database, where in the set application management entry, the application freezing period is equal to k times the basic freezing control period, and the latest unfreezing moment is the last reached basic unfreezing moment, the value of k being an integer greater than or equal to 1.

Therefore, in this example, for an application in the frozen state, in response to the basic unfreezing moment in the basic unfreezing control period being reached, the application freezing period and the latest unfreezing moment for the application may be extracted from the application management entry corresponding to the application in the application management database, so as to determine whether the time difference between the currently reached basic unfreezing moment and the latest unfreezing moment for the application is greater than or equal to the application freezing period of the application. If the time difference between the currently reached basic unfreezing moment and the latest unfreezing moment for the application is greater than or equal to the application freezing period of the application, it indicates that the application meets the unfreezing condition; and if the time difference between the currently reached basic unfreezing moment and the latest unfreezing moment for the application is less than the application freezing period of the application, it indicates that the application does not meet the unfreezing condition at present, and then the determination will be made again in the next basic freezing control period.

In some examples of this embodiment, after unfreezing the application that meets the unfreezing condition, the method may further include: updating the latest unfreezing moment for the unfrozen application to the basic unfreezing moment in the application management entry corresponding to the unfrozen application in the application management database.

In some examples of this embodiment, the application freezing period of an application may be set to be equal to n times the basic freezing control period, n being an integer greater than or equal to 1.

Alternatively, in some examples of this embodiment, the application freezing period of an application may also be dynamically updated according to requirements, so as to improve the precision of application unfreezing control. At this point, in this example, it is also possible to detect whether the application freezing period update condition for an application is satisfied, and if it is detected that the application freezing period update condition for an application is satisfied, the application freezing period of the application is updated in the application management entry corresponding to the application.

In this embodiment, the application freezing period update condition may also be flexibly set and/or updated according to the application scenario. For example, in some examples, based on at least one of the duration of continuous running of the application after the current start-up, the type of the application, the current task mode of the application, the user usage scenario, the terminal device battery level, the terminal device screen state, the terminal device network environment or the terminal device charging state, etc., it may be determined whether the application freezing period of the application needs to be updated. Further, in some other examples, according to the power consumption of the application in the running process, it may be determined whether the application freezing period of the application needs to be updated. Hereinafter, an implementation will be illustrated in which it is determined, according to the power consumption of an application in the running process, whether the application freezing period of the application needs to be updated. In this implementation, the application freezing period update condition being satisfied includes, but is not limited to, at least one of the following: an average power consumption value Pw of the application in previous m application freezing periods being greater than or equal to a preset maximum power consumption threshold Pmax; or an average power consumption value Pw of the application in previous m application freezing periods being less than or equal to a preset minimum power consumption threshold Pmin, where m is an integer greater than or equal to 2. In this embodiment, the value of m can be the same for all applications. In some other application scenarios, corresponding m values may be set for different types of applications according to their types, or corresponding m values may be set for different applications according to their needs.

Alternatively, in some examples of this embodiment, in order to improve the accuracy of the update of the application freezing period, when recording the average power consumption value Pw of the application, it is possible to record only the average power consumption value of the application in the application freezing periods in which the application has been running in the background. That is, the recorded m application freezing periods may be application freezing periods in which the application keeps running in the background. Therefore, in some examples of this embodiment, a list of foreground applications may be maintained for applications to record the applications that have run in the foreground as a basis for determination.

In this example, the process of updating the application freezing period of the application in its corresponding application management entry may include, but is not limited to: increasing the application freezing period of the application in response to Pw of the application being greater than or equal to Pmax; and decreasing the application freezing period of the application in response to Pw of the application being less than or equal to Pmin.

In this embodiment, when the application freezing period of the application needs to be increased, the way of increasing may also be flexibly set. For example, the application freezing period may be updated to be equal to the application freezing period plus x times the basic freezing control period, where the value of x may be set flexibly, e.g., it may be set to 1, or 2 or 3, etc., as needed.

In this embodiment, when the application freezing period of the application needs to be decreased, the way of decreasing may also be flexibly set. For example, the application freezing period may be updated to be equal to the application freezing period minus x times the basic freezing control period.

In this embodiment, for all applications, the same Pmax and Pmin values may be used to perform the update determination of the application freezing period. Corresponding Pmax and Pmin values may also be set for different types of applications according to the type of application, or corresponding Pmax and Pmin values may also be set for different applications according to their needs.

Alternatively, in this embodiment, after updating the application freezing period of the application, the updated application freezing period may also be calibrated, thereby improving the accuracy of the application freezing period and further ensuring the precision of the application unfreezing control. For example, when increasing the application freezing period of the application or after increasing the application freezing period of the application, the process further includes: in response to determining that the increased application freezing period is greater than the preset maximum application freezing period, setting the application freezing period of the application to the maximum application freezing period; and when decreasing the freezing period of the application or after decreasing the application freezing period of the application, the process further includes: in response to determining that the decreased application freezing period is less than the preset minimum application freezing period, setting the application freezing period of the application to the minimum application freezing period.

Alternatively, in this embodiment, for all applications, the same maximum application freezing period value and minimum application freezing period value may be used to calibrate the application freezing period. The maximum application freezing period value and the minimum application freezing period value may also be set for different types of applications according to the type of application, or the maximum application freezing period value and the minimum application freezing period value may be set for different applications according to their needs.

Alternatively, in this embodiment, the maximum application freezing period value and the minimum application freezing period value may also be dynamically updated. For example, when corresponding maximum and minimum application freezing period values are set for different applications according to their needs, the maximum application freezing period value and the minimum application freezing period value may be updated dynamically according to the number of times or frequency of the application being switched from the background to the foreground within a certain period of time, thus allowing better unfreezing control of the application to meet the needs of the application to perform its corresponding functions.

The application freezing control method provided in this embodiment not only can cyclically and dynamically unfreezing and freezing the applications on the terminal device through the set basic freezing control period, thus achieving a reasonable balance between energy saving and normal execution of application functions, and avoiding power consumption due to applications satisfying the freezing condition not being frozen in time, i.e., achieving reasonable energy saving control, but also can centralize the unfreezing and freezing of applications at the basic unfreezing and freezing moments, thus improving the efficiency of freezing control, resource utilization and the rationality of freezing control, and thus enhancing the satisfaction of user experience.

EMBODIMENT II

On the basis of the above embodiment, this embodiment is illustrated with the implementation process of an application freezing control method as an example.

In this embodiment, a system basic freezing control period is set, which includes a basic freezing moment tf(a) and a basic unfreezing moment tu(a) so as to form a corresponding system freezing window and unfreezing window, so that background applications satisfying the freezing condition are frozen in the system freezing window; while in the system unfreezing window, the system can actively unfreeze applications satisfying the unfreezing condition, and allow these applications to carry out normal activities.

On this basis, the system can dynamically adjust freezing periods corresponding to different applications according to running information for each background application, and decide, based on the freezing period of an application in the frozen state, whether to unfreeze the application in a system unfreezing window and allow it to run.

Figure 2:
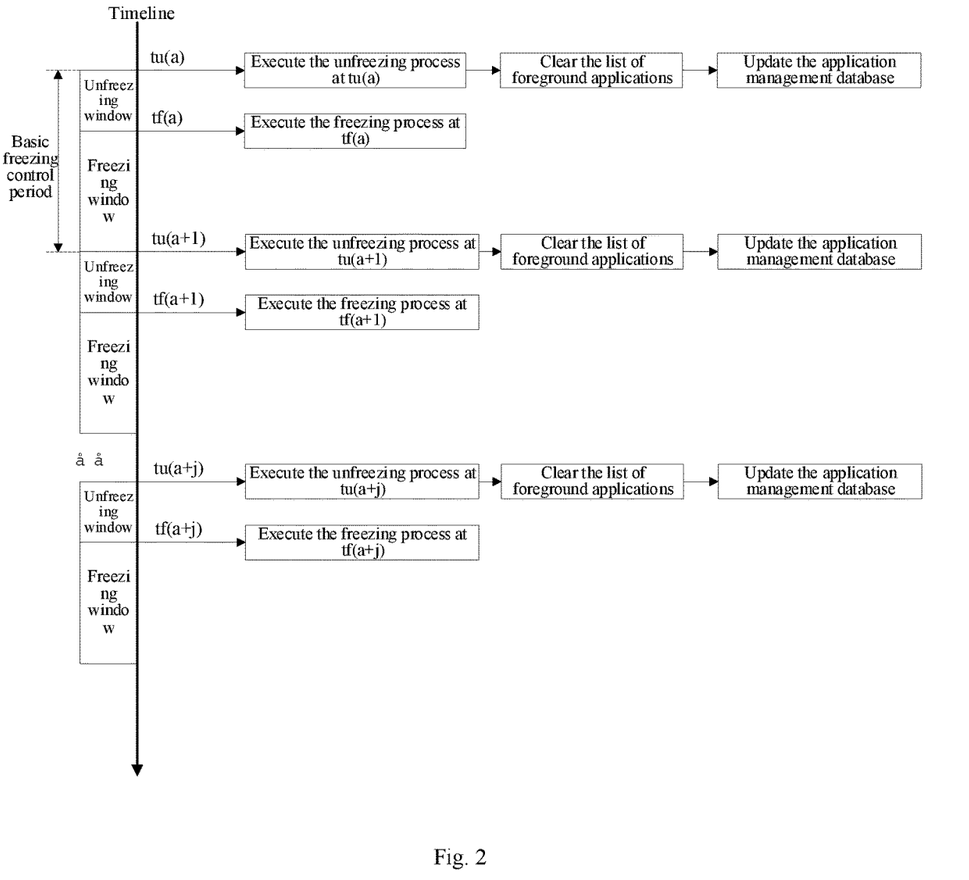
FIG. 2 is a schematic diagram of a general processing process for freezing control provided in embodiment II of the present disclosure.

The general processing process for application freezing control is shown in FIG. 2, which mainly includes the following processes in time sequence: waiting for the time to reach the basic unfreezing moment tu(a), and executing the unfreezing process at that basic unfreezing moment; updating, according to an application in a list of foreground applications, a corresponding background/foreground switching record in an application management entry corresponding to the application, and clearing the list of foreground applications; updating the application management database (Data Base, DB) 1; waiting for the time to reach the basic freezing moment tf(a), and executing the freezing process at the tf(a) moment; and waiting for the time to reach the next basic freezing control period, and executing the above process cyclically.

As shown in FIG. 2, tu(a), tu(a+1), . . . , and tu(a+j) are basic unfreezing moments, and tf(a), tf(a+1), tf(a+j) . . . are called basic freezing moments. The period between two adjacent basic freezing moments/basic unfreezing moments is a basic freezing control period Tsys. Assume that the system unfrozen an application at moment tu(a). If the application freezing period of the application is n*Tsys, that application will be unfrozen again at tf(a+n).

At a basic freezing moment, the system may freeze in batches all applications that are not in the frozen state and satisfy the freezing condition. At a basic unfreezing moment, the system will calculate, according to the application freezing period and the latest unfreezing moment for each application in the frozen state, which frozen applications may be unfrozen at this unfreezing moment, and unfreeze these applications to make them return to the executable state. In this embodiment, the latest unfreezing moment for an application may be the most recent unfreezing moment for the application traced back from the current time point, and each time the application is unfrozen at a basic unfreezing moment, the latest unfreezing moment will be updated to that basic unfreezing moment.

Figure 3:
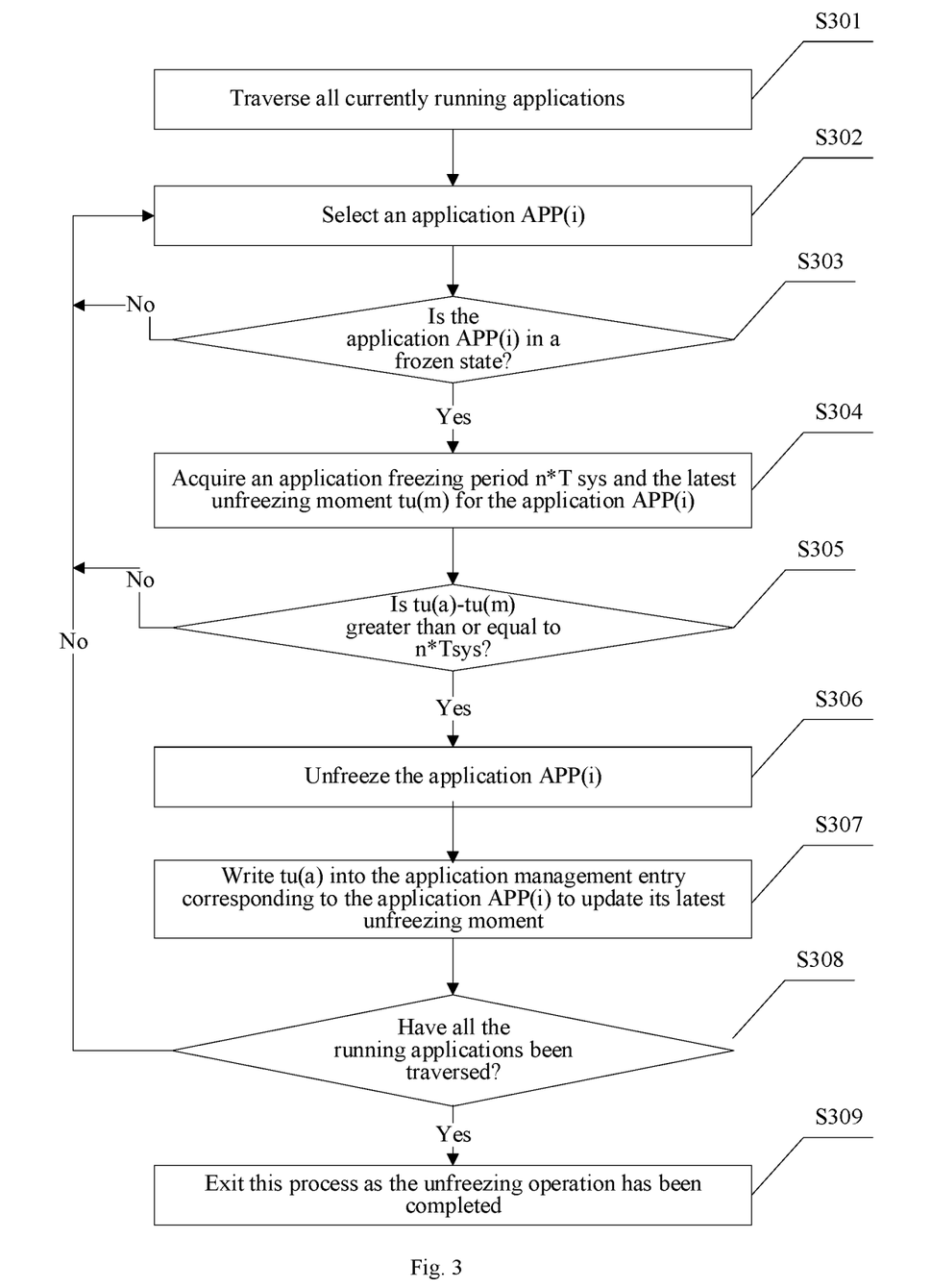
FIG. 3 is a flowchart of an unfreezing process provided in embodiment II of the present disclosure.

In this embodiment, when the time reaches the basic unfreezing moment tu(a), the process of executing the unfreezing process at this basic unfreezing moment is shown in FIG. 3, including the following steps.

At S301, all currently running applications are traversed.

At S302, an Application (APP) (i) is selected.

At S303, it is determined whether the application APP(i) is in a frozen state. If the application APP(i) is in the frozen state, S304 is to be executed; and if the application APP(i) is not in the frozen state, the process proceeds to S302.

At S304, the application freezing period n*Tsys of the application APP(i) and the latest unfreezing moment tu(m) of the application APP(i) are acquired from the application management database DB1.

At S305, it is determined whether the time difference between the current basic unfreezing moment tu(a) and tu(m) is greater than or equal to the application freezing period n*Tsys. If the time difference between the current basic unfreezing moment tu(a) and tu(m) is greater than or equal to the application freezing period n*Tsys, the process proceeds to S306; and if the time difference between the current basic unfreezing moment tu(a) and tu(m) is less than the application freezing period n*Tsys, the process proceeds to S302.

At S306, the application APP(i) is unfrozen.

At S307, the current basic unfreezing moment tu(a) is written into the application management entry corresponding to the application APP(i) in the application management database to update its latest unfreezing moment.

At S308, it is determined whether all currently running applications have been traversed. If so, S309 is to be executed; and if not, S302 is to be executed.

At S309, the unfreezing operation is completed, and this process is exited.

Figure 4:
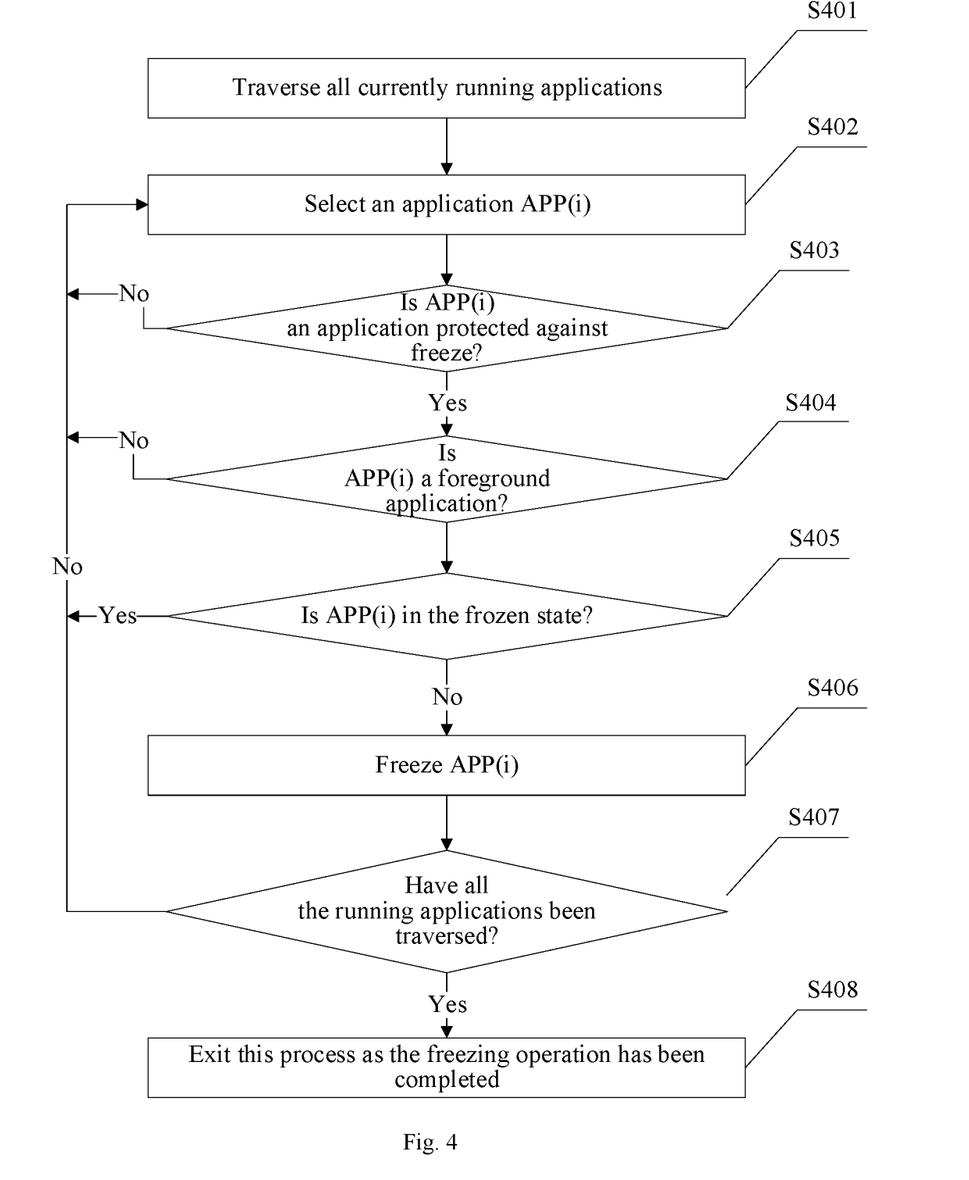
FIG. 4 is a flowchart of a freezing process provided in embodiment II of the present disclosure.

In this embodiment, when a basic freezing moment tf(a) is reached, the process of executing the freezing process at this basic freezing moment is shown in FIG. 4, including the following steps:

At S401, traversing of all currently running applications is started.

At S402, an application APP(i) is selected.

At S403, according to the freezing protection database DB2, it is determined whether the application APP(i) is an application protected against freeze. If the application APP(i) is an application protected against freeze, S402 is to be executed; and if the application APP(i) is not an application protected against freeze, S404 is to be executed.

At S404, it is determined whether the application APP(i) is a foreground application. If the application APP(i) is a foreground application, S402 is to be executed; and if the application APP(i) is not a foreground application, S405 is to be executed.

At S405, it is determined whether the application APP(i) is in a frozen state. If the application APP(i) is in a frozen state, S402 is to be executed; and if the application APP(i) is not in a frozen state, S406 is to be executed (there is no strict limitation on the execution timing of the three execution steps of S403, S404 and S405).

At S406, the application APP(i) is frozen.

At S407, it is determined whether all currently running applications have been traversed. If so, S408 is to be executed; and if not, S402 is to be executed.

At S408, the freezing operation is completed, and this process is exited.

Figure 5:
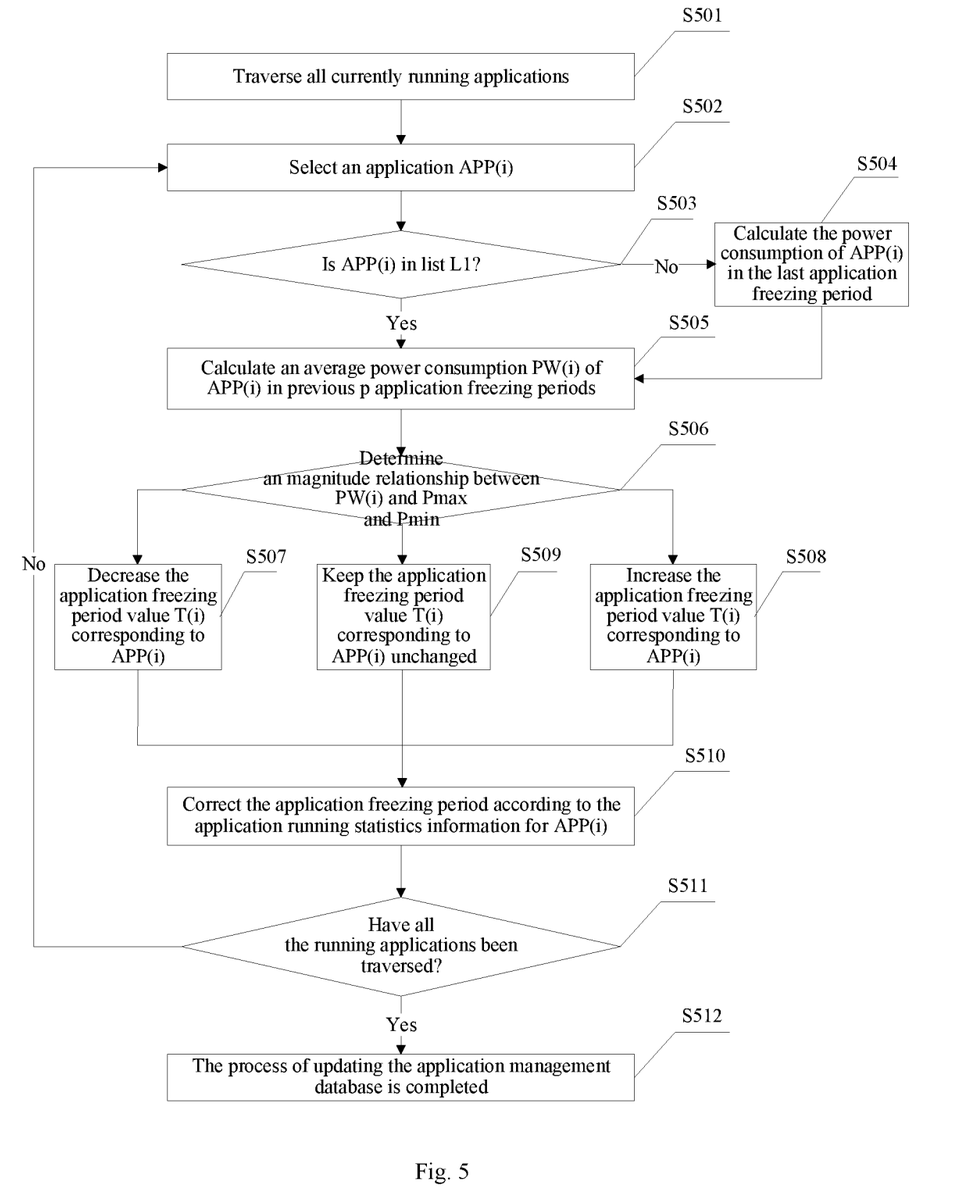
FIG. 5 is a flowchart of a process of updating an application management database provided in embodiment II of the present disclosure.

In this embodiment, an exemplary process of updating the application management database DB1 (including updating and correcting the application freezing period of the application) is shown in FIG. 5, including the following steps.

At S501, traversing of all running applications is started.

At S502, a running application APP(i) is selected.

At S503, it is determined whether the application APP(i) is in the list of foreground applications L1. If the application APP(i) is in the list of foreground applications L1, S505 is to be executed; and if the application APP(i) is not in the list of foreground applications L1, S504 is to be executed.

At S504, the power consumption of the last application freezing period of the application APP(i) is calculated using a power consumption statistics module M1, and stored in a historical power consumption linked list in application running statistics information for an entry corresponding to the application APP(i) in the application management database DB1.

At S505, the average power consumption PW(i) of previous p application freezing periods of the application APP(i) is calculated according to the historical power consumption linked list in the application running statistics information for the entry corresponding to the application APP(i) in the application management database DB1, where in an example, when there are currently less than p application freezing periods, the calculation can be temporarily not performed (that is, no adjustments to the application freezing cycles are made), or the average power consumption of the current actual number of application freezing periods can be calculated.

At S506, the magnitude relationship between PW(i) and thresholds Pmax and Pmin is determined, if PW(i)<Pmin, S507 is to be executed; if PW(i)>Pmax, S508 is to be executed; and if Pmax≥PW(i)≥Pmin, S509 is to be executed, where Pmax and Pmin are preset thresholds for evaluating the magnitude of PW(i), and Pmax≥Pmin.

At S507, the application freezing period value T(i) in the application management entry corresponding to the application APP(i) in the application management database DB1 is decreased, and in this embodiment, the value is decreased by one basic freezing control period Tsys, that is, T(i)=T(i)−Tsys.

At S508, the application freezing period value T(i) of the entry corresponding to the application APP(i) in the application management database DB1 is increased, and in this embodiment, the value is increased by one basic freezing control period Tsys, that is, T(i)=T(i)+Tsys.

At S509, the application freezing period value T(i) of the entry corresponding to the application APP(i) in the application management database DB1 is kept unchanged.

At S510, according to the application running statistics information for the application APP(i), the application freezing period is corrected. The system may calculate the upper and lower limits Tmax(i) and Tmin(i) of the application freezing period of the application according to the application running statistics information. For example, when the user actively switches applications to the foreground more often and for a longer period of time in the past, Tmax(i) and Tmin(i) are smaller, while when the user actively switches applications to the foreground less often and for a shorter period of time in the past, Tmax(i) and Tmin(i) are greater. Thereafter, it is determined whether the current application freezing period T(i) is between Tmax(i) and Tmin(i), if T(i) is greater than or equal to Tmax (I), T(i) is set equal to Tmax(i); and if T(i) is less than or equal to Tmin(i), T(i) is set equal to Tmin(i).

At S511, it is determined whether all application entries in the application management database DB1 have been traversed. If all application entries in the application management database DB1 have been traversed, S512 is to be executed; and if all application entries in the application management database DB1 have not been traversed, S502 is to be executed.

At S512, the process of updating the application management database is finished, and this process is exited.

Figure 6:
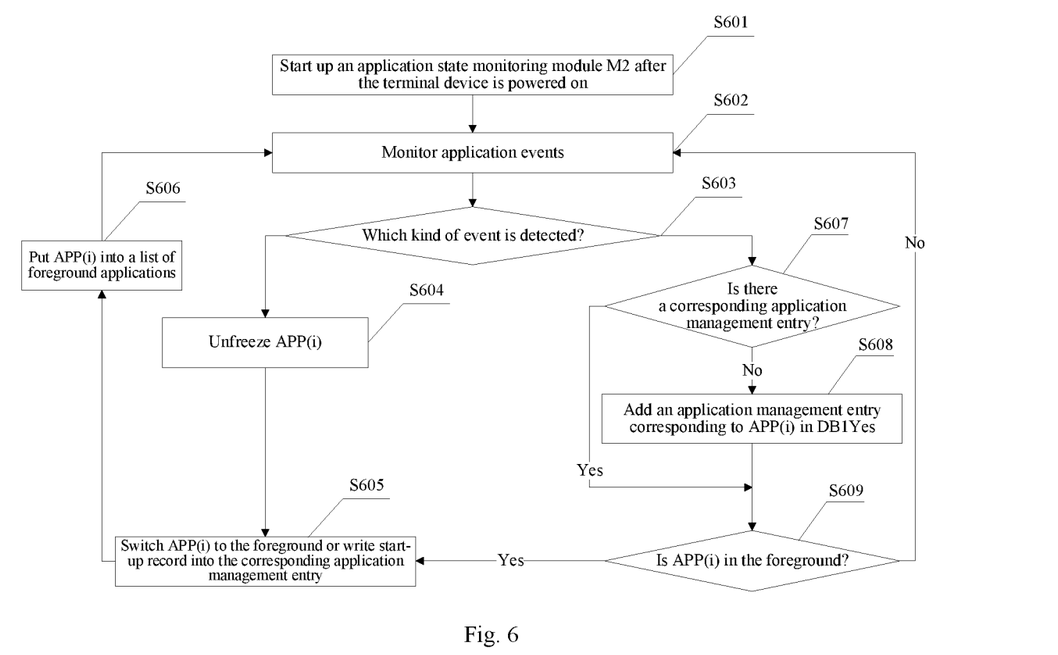
FIG. 6 is a flowchart of an application monitoring processing process provided in embodiment II of the present disclosure.

In this embodiment, an exemplary application monitoring processing process (which may be executed by the application state monitoring module M2) is shown in FIG. 6, including:

At S601, after the terminal device is powered on, the application state monitoring module M2 is started up, and the execution of S602 is started.

At S602, application events are monitored, including monitoring application switching from background to foreground events and application start-up events.

At S603, it is determined which kind of event is detected. If an application switching from background to foreground event is detected, the process proceeds to S604; and if an application start-up event is detected, the process proceeds to S606.

At S604, APP(i) is unfrozen.

At S605, APP(i) is switched to the foreground and/or the start-up record of APP(i) is written into an application management entry corresponding to APP(i) in the application management database DB1, and written into the application running statistics information.

At S606, the application APP(i) is put into the list of foreground applications L1, and S602 is to be executed.

At S607, it is determined whether there is an application management entry corresponding to the application APP(i) in the application management database DB1. If there is an application management entry corresponding to the application APP(i) in the application management database DB1, S609 is to be executed; and if there is no application management entry corresponding to the application APP(i) in the application management database DB1, S608 is to be executed.

At S608, the application management entry corresponding to APP(i) is added in the application management database DB1. Further, initialization is performed: the application freezing period corresponding to APP(i) is set to the basic freezing control period, the latest unfreezing moment is set to the last basic unfreezing moment closest to the current time point, and all power consumption values in its historical power consumption linked list are initialized to 0.

At S609, it is determined whether the application APP(i) is in the foreground. If the application APP(i) is in the foreground, S605 is to be executed; and if the application APP(i) is not in the foreground, S602 is to be executed.

Figure 7:
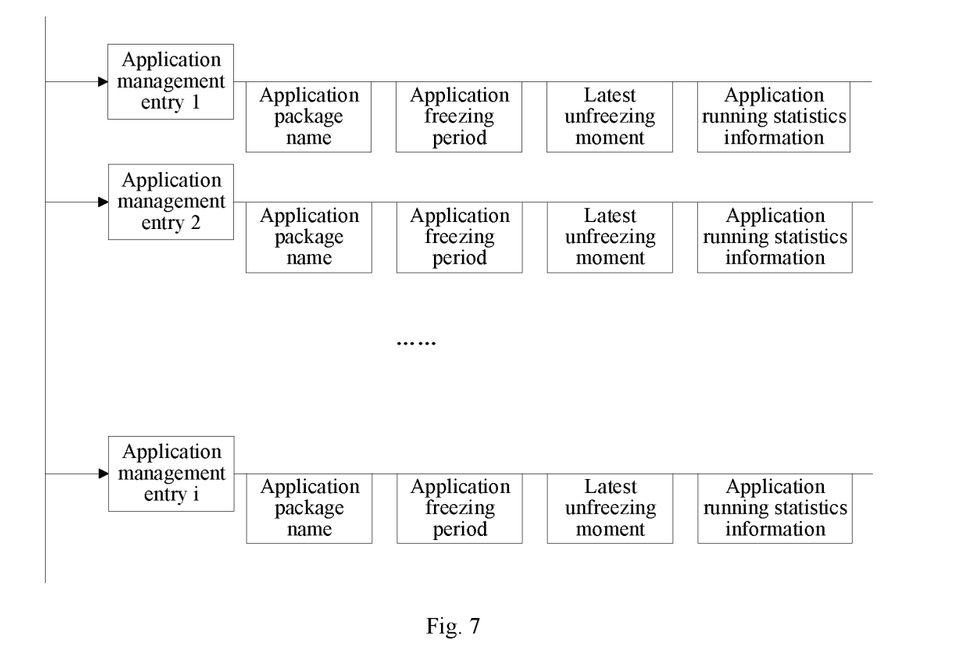
FIG. 7 is a structural schematic diagram of an application management database provided in embodiment II of the present disclosure.

This embodiment will be illustrated below with an exemplary application management database DB1 as an example. As shown in FIG. 7, the application management database contains multiple application management entries. Each application management entry corresponds to an application, and contains the package name of the application, the latest unfreezing moment, the application freezing period, and the application running statistics information, where the application running statistics information includes a historical power consumption linked list and records of application start-up and foreground and background switching.

The historical power consumption linked list records the power consumption values of p application freezing periods of the application, and follows the principle of "first in first out", that is, when a new value is inserted into the linked list, the earliest inserted value in the linked list will be discarded, so as to ensure that the power consumption values in the linked list are always new values and the total number is p. The records of application start-ups and foreground-background switching contains two linked lists, which record the start-up/foreground switch-in time and background switch-in time of the corresponding application, respectively.

In this embodiment, the freezing protection database DB2 is a preset database, and it may also contain multiple entries, each of which only contains information about the package name of one application. The entries in the database may be modified by the user through the setting interface or may be updated by connecting to the server.

Multiple members may be inserted into the list of foreground applications L1, and each member is the package name of an application. If the package name of APP(i) is in the list of foreground applications L1, it means that APP(i) was once placed in the foreground in the current application freezing period.

In this embodiment, the power consumption statistics module M1 may acquire, through a framework service, the central processing unit (CPU) usage time, the network usage time, the number of network packets transmitted and received, the number of network bits transmitted and received, the Global Positioning System (GPS) usage time, the sensor usage time, the wake_lock lock time and other parameters of an application APP(i) during the current application freezing period, and obtain an estimated power consumption value of the APP(i) during the current application freezing period by multiplying these parameters by corresponding power consumption coefficients.

In this embodiment, the application state monitoring module M2 is configured to monitor the automatic update of the list of foreground applications L1 and the application management database DB1 by each application when the application is switched to the foreground or started up.

The freezing and unfreezing operations in this embodiment are not only applicable to the freezing mechanism that prohibits the application process from acquiring CPU time, but also applicable to other mechanisms that can cause the target application process unable to be run and unable to use network, sensor and GPS, and other resources.

Alternatively, in this embodiment, a scenario analysis module may also be set to analyze the real-time usage scenario for each application, and analyze whether each application is currently in a scenario of audio playback, data download, navigation and other scenarios that require high real-time performance, and when an application is analyzed to be in a scenario requiring high real-time performance, the application is written into the freezing protection database DB2 or temporarily or permanently prohibited from being frozen by other means.

EMBODIMENT III

Figure 8:
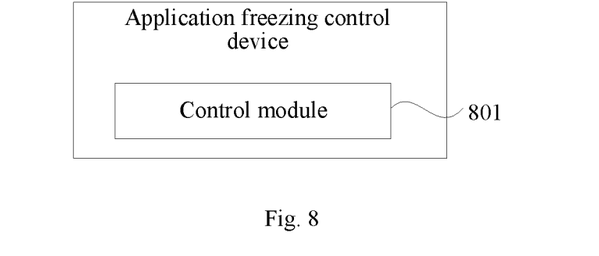
FIG. 8 is a structural schematic diagram of an application freezing control device provided in embodiment III of the present disclosure.

This embodiment provides an application freezing control device, which can be provided in a terminal device, as shown in FIG. 8, including: a control module 801 configured to unfreeze, in response to a basic unfreezing moment in a basic freezing control period being reached, an application which is currently in a frozen state and meets an unfreezing condition; and freeze, in response to a basic freezing moment in the basic freezing control period being reached, an application which is currently in an unfrozen state and meets a freezing condition.

In some examples of this embodiment, the freezing condition includes, but is not limited to, the application being not an application in a freezing protection database, and the application is currently running in the background.

The basic freezing control period set in this embodiment is configured for periodic control of the applications in a cyclic manner. The basic freezing control period in this embodiment includes a basic unfreezing moment and a basic freezing moment. In this embodiment, the freezing control object includes applications currently running in the terminal device, including applications currently running in the background.

In this embodiment, after the control module 801 unfreezes the application which is currently in the frozen state and meets the unfreezing condition, the unfrozen application may continue to perform its corresponding functions, thus avoiding the situation where all background activities of the frozen application cannot be executed because it is frozen for a long time.

In this embodiment, the unfreezing condition for frozen applications may also be set flexibly. For example, in some examples, an unfreezing condition may be set according to the type of the frozen application, and in some other examples of this embodiment, an application freezing period may also be set for the application, which is used to characterize the length of time the application needs to be in the freezing period when it is frozen. In this example, the unfreezing condition may be set based on the application freezing period of the application. For example, the unfreezing condition may include: the time difference between the currently reached basic unfreezing moment and the latest unfreezing moment for the application is greater than or equal to the application freezing period of the application.

In some examples of this embodiment, an application management database may be set, which may be used to store application management entries respectively corresponding to multiple applications. Further, in this example, a corresponding application management entry may be created in the application management database for an application upon installation of the application in the terminal device; or a corresponding application management entry may be created in the application management database for an application in response to detecting that the application is being started up on the terminal device. In addition, the contents included in the application management entries in this embodiment may also be flexibly set according to requirements. For example, it may include the unique identification information for the application, the application freezing period of the application, the latest unfreezing moment for the application, etc. In some application scenarios, the application management entry may also include application running statistics information, which may be used to record at least one of the power consumption of the running of the application, whether it is running in the foreground or the background, or whether it is in the frozen state, etc. For example, in an application scenario, the control module 801 sets an application management entry in the application management database for an application in response to detecting that the application is being started up and has no corresponding application management entry in the application management database, where in the set application management entry, the application freezing period is equal to k times the basic freezing control period, and the latest unfreezing moment is the last reached basic unfreezing moment, the value of k being an integer greater than or equal to 1.

For an application in the frozen state, in response to the basic unfreezing moment in the basic unfreezing control period being reached, the control module 801 may extract the application freezing period and the latest unfreezing moment for the application from the application management entry corresponding to the application in the application management database, so as to determine whether the time difference between the currently reached basic unfreezing moment and the latest unfreezing moment for the application is greater than or equal to the application freezing period of the application. If the time difference between the currently reached basic unfreezing moment and the latest unfreezing moment for the application is greater than or equal to the application freezing period of the application, it indicates that the application meets the unfreezing condition; and if the time difference between the currently reached basic unfreezing moment and the latest unfreezing moment for the application is less than the application freezing period of the application, it indicates that the application does not meet the unfreezing condition at present, and then the determination will be made again in the next basic freezing control period.

In some examples of this embodiment, after the control module 801 unfreezes the application that meets the unfreezing condition, the process may further include: updating the latest unfreezing moment for the unfrozen application to the basic unfreezing moment in the application management entry corresponding to the unfrozen application in the application management database.

Alternatively, in some examples of this embodiment, the application freezing period of an application may also be dynamically updated by the control module 801 according to requirements, so as to improve the precision of application unfreezing control. At this point, in this example, the control module 801 may also detect whether the application freezing period update condition for an application is satisfied, and if it is detected that the application freezing period update condition for an application is satisfied, update the application freezing period of the application in the application management entry corresponding to the application. For example, in some examples, based on at least one of the duration of continuous running of the application after the current start-up, the type of the application, the current task mode of the application, the user usage scenario, the terminal device battery level, the terminal device screen state, the terminal device network environment or the terminal device charging state, etc., the control module 801 may also determine whether the application freezing period of the application needs to be updated. Further, in some other examples, according to the power consumption of the application in the running process, the control module 801 may determine whether the application freezing period of the application needs to be updated. Hereinafter, an implementation will be illustrated in which it is determined, according to the power consumption of an application in the running process, whether the application freezing period of the application needs to be updated. In this implementation, the application freezing period update condition being satisfied includes, but is not limited to, at least one of the following: an average power consumption value Pw of the application in previous m application freezing periods is greater than or equal to a preset maximum power consumption threshold Pmax; or an average power consumption value Pw of the application in previous m application freezing periods is less than or equal to a preset minimum power consumption threshold Pmin, In this embodiment, the value of m can be the same for all applications. In some other application scenarios, corresponding m values may be set for different types of applications according to their types, or corresponding m values may be set for different applications according to their needs.

Alternatively, in some examples of this embodiment, in order to improve the accuracy of the update of the application freezing period, when recording the average power consumption value Pw of the application, the control module 801 may record only the average power consumption value of the application in the application freezing periods in which the application has been running in the background. That is, the recorded m application freezing periods may be application freezing periods in which the application keeps running in the background. Therefore, in some examples of this embodiment, a list of foreground applications may be maintained for applications to record the applications that have run in the foreground as a basis for determination.

In this example, the process of updating the application freezing period of the application in its corresponding application management entry may include, but is not limited to: increasing the application freezing period of the application in response to Pw of the application being greater than or equal to Pmax; and decreasing the application freezing period of the application in response to Pw of the application being less than or equal to Pmin.

In this embodiment, when the control module 801 needs to increase the application freezing period of the application, the way of increasing may also be flexibly set. For example, the application freezing period may be updated to be equal to the application freezing period plus x times the basic freezing control period, where the value of x may be set flexibly, e.g., it may be set to 1, or 2 or 3, etc., as needed.

When the control module 801 needs to decrease the application freezing period of the application, the way of decreasing may also be flexibly set. For example, the application freezing period may be updated to be equal to the application freezing period minus x times the basic freezing control period.

In this embodiment, for all applications, the same Pmax and Pmin values may be used to perform the update determination of the application freezing period. Corresponding Pmax and Pmin values may also be set for different types of applications according to the type of application, or corresponding Pmax and Pmin values may also be set for different applications according to their needs.

Alternatively, in this embodiment, after updating the application freezing period of the application, the updated application freezing period may also be calibrated by the control module 801, thereby improving the accuracy of the application freezing period and further ensuring the precision of the application unfreezing control. For example, when the control module 801 increases the application freezing period of the application or after it increases the application freezing period of the application, the process further includes: in response to determining that the increased application freezing period is greater than the preset maximum application freezing period, setting the application freezing period of the application to the maximum application freezing period; and when decreasing the freezing period of the application or after decreasing the application freezing period of the application, the process further includes: in response to determining that the decreased application freezing period is less than the preset minimum application freezing period, setting the application freezing period of the application to the minimum application freezing period.

Alternatively, in this embodiment, for all applications, the control module 801 may use the same maximum application freezing period value and minimum application freezing period value to calibrate the application freezing period. The maximum application freezing period value and the minimum application freezing period value may also be set for different types of applications according to the type of application, or the maximum application freezing period value and the minimum application freezing period value may be set for different applications according to their needs.

Alternatively, in this embodiment, the control module 801 may also update the maximum application freezing period value and the minimum application freezing period value dynamically. For example, when corresponding maximum and minimum application freezing period values are set for different applications according to their needs, the maximum application freezing period value and the minimum application freezing period value may be updated dynamically according to the number of times or frequency of the application being switched from the background to the foreground within a certain period of time, thus allowing better unfreezing control of the application to meet the needs of the application to perform its corresponding functions.

In this embodiment, the functions of the control module 801 may be realized by the processor of the terminal device where the application freezing control device is located, thus achieving a reasonable balance between energy saving and normal execution of application functions, and avoiding power consumption due to applications satisfying the freezing condition not being frozen in time, i.e., achieving reasonable energy saving control, but also can centralize the unfreezing and freezing of applications at the basic unfreezing and freezing moments, thus improving the efficiency of freezing control, resource utilization and the rationality of freezing control, and thus enhancing the satisfaction of user experience.

EMBODIMENT IV

Figure 9:
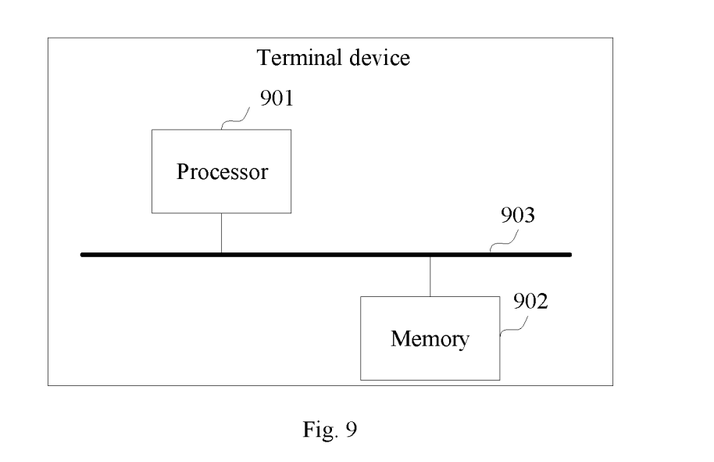
FIG. 9 is a structural schematic diagram of a terminal device provided in embodiment IV of the present disclosure.

This embodiment provides a terminal device, where the terminal device in this embodiment may include various mobile terminal devices, and may also be a non-mobile terminal device. Referring to FIG. 9, it includes a processor 901, a memory 902 and a communication bus 903, where the communication bus 903 is configured to connect the processor 901 and the memory 902; and the processor 901 is configured to execute the computer program stored in the memory 902 to implement the steps of the application freezing control method illustrated in the embodiments of the present disclosure. Here, the memory 902 may be the memory of the terminal device itself; it may not include a memory provided on the terminal device part that may be separated from the terminal device; it may be set, as required, to include the memory provided on the terminal device part that may be separated from the terminal device.

Figure 10:
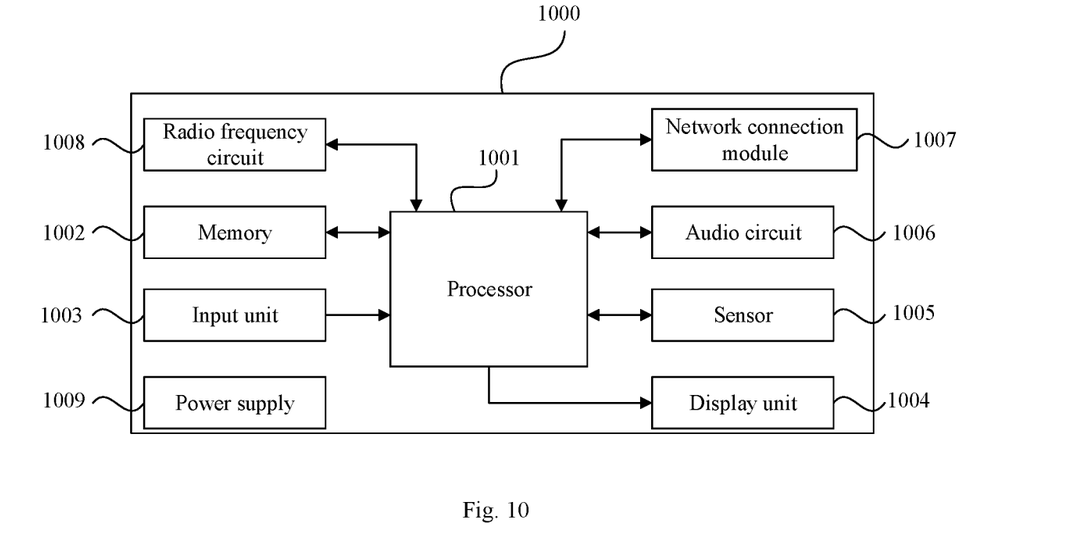
FIG. 10 is a structural schematic diagram of another terminal device provided in embodiment IV of the present disclosure.

In this embodiment, the terminal device shown in FIG. 9 may be a mobile phone, a tablet computer, a laptop computer, a hand-held computer, a smart television, a mobile Internet device, a wearable device, or other terminal device on which an application client may be installed, or any other terminal device or device that may implement the application freezing control method of the present invention. This embodiment will be illustrated below with the structure of a terminal device shown in FIG. 10 as an example. In a specific embodiment of the terminal device involved in the embodiments of the present disclosure, terminal device 1000 includes components such as a radio frequency circuit 1008, a memory 1002 of one or more computer-readable storage media, an input unit 1003, a display unit 1004, a sensor 1005, an audio circuit 1006, a network connection module 1007 (e.g., a Wi-fi module), one or more processors 1001, and a power supply 1009. The above structure does not constitute a limitation to the terminal device and may include more or fewer components than those listed. The radio frequency circuit 1008 may be configured to receive and transmit communication signals, and receive information from the base station, which is then handed over to the processor 1001 for processing. The memory 1002 is configured to store software programs (including but not limited to the above computer programs) and modules, and the processor 1001 is configured to execute various functions and data processing by running the software programs or modules of the memory 1002. The input unit 1003 may be configured to receive the input digital or character information. The input unit 1003 may include various input devices, such as touch screen input and other input devices. The input unit 1003 also converts each type of input information into computer instructions and sends them to the processor 1001, and may also receive commands from the processor 1001 for execution. The display unit 1004 is configured to display information which is input by the user or information which is provided by the terminal device to the user and various graphical user interfaces on the terminal device. The terminal device 1000 also includes at least one sensor, e.g., a light sensor, a motion sensor, etc. The terminal device 1000 may also include components such as the audio circuit 1006, the network connection module 1007, and the power supply 1009.

This embodiment further provides a computer-readable storage medium that includes a volatile or non-volatile, removable or non-removable medium implemented in any method or technology for storing information, such as computer-readable instructions, data structures, computer program modules, or other data. The computer-readable storage media include, but are not limited to, random access memory (RAM), read-only memory (ROM), electrically erasable programmable read-only memory, EEPROM), flash memory or other memory technologies, compact disc read-only memory (CD-ROM), digital versatile disc read-only memory (DVD-ROM) or other optical disc storage, cassettes, magnetic tapes, magnetic disc storage or other magnetic storage devices, or any other media that can be configured to store desired information and can be accessed by computers.

In some examples, the computer-readable storage medium in this embodiment may be configured to store one or more computer programs executable by one or more processors to implement the steps of the application freezing control method illustrated in the above embodiments.

This embodiment further provides a computer program (or computer software), which may be distributed on a computer-readable medium and may be executed by a computing device to implement at least one step of the application freezing control method illustrated in the embodiments of the present disclosure; and in some cases, at least one step illustrated or described may be performed in an order different from that described in the above embodiments.

This embodiment further provides a computer program product including a computer-readable device on which a computer program as illustrated above is stored. In this embodiment, the computer-readable device may include the computer-readable storage medium as illustrated above.

All or some of the steps in the methods disclosed above, functional modules/units in the systems and devices disclosed above may be implemented as software (which may be implemented by computer program code executable by a computing device), firmware, hardware, and appropriate combinations thereof. In the hardware implementation, the division between functional modules/units mentioned in the above description does not necessarily correspond to the division of physical components; for example, a physical component may have multiple functions, or a function or step may be performed cooperatively by a plurality of physical components. some or all of the physical components may be implemented as software executed by a processor, such as a central processing unit, a digital signal processor or a microprocessor, or as hardware, or as an integrated circuit, such as an application specific integrated circuit.

Communication media typically contain computer-readable instructions, data structures, computer program modules or other data in a modulated data signal such as a carrier wave or other transmission mechanism, and can include any information delivery media. Therefore, the present disclosure is not limited to any particular combination of hardware and software.

The invention claimed is:

1. An application freezing control method applicable to a terminal device, comprising:
   unfreezing, in response to a basic unfreezing moment in a basic freezing control period being reached, an application which is in a frozen state and meets an unfreezing condition;
   freezing, in response to a basic freezing moment in the basic freezing control period being reached, the application which is in an unfrozen state and meets a freezing condition;
   determining, according to a power consumption of the application in a running process, whether an application freezing period of the application is to be updated; and
   updating the application freezing period of the application, in response to an average power consumption value Pw of the application in previous m application freezing periods being greater than or equal to a preset maximum power consumption threshold Pmax; or
   updating the application freezing period of the application, in response to the average power consumption value Pw of the application in the previous m application freezing periods being less than or equal to a preset minimum power consumption threshold Pmin,
   wherein m is an integer greater than or equal to 2.

2. The method of claim 1, wherein the unfreezing condition comprises:
   a time difference between the basic unfreezing moment and a latest unfreezing moment for the application being greater than or equal to the application freezing period of the application, wherein the latest unfreezing moment is the moment when the application was last unfrozen; and
   the application freezing period and the latest unfreezing moment for the application are acquired from an application management entry corresponding to the application in an application management database.

3. The method of claim 2, after unfreezing the application which is in the frozen state and meets the unfreezing condition, the method further comprising:
   updating the latest unfreezing moment for the application to the basic unfreezing moment in the application management entry corresponding to the application.

4. The method of claim 3, further comprising:
   setting an application management entry in the application management database for a newly added application in response to detecting that the newly added application is being started up and has no corresponding application management entry in the application management database, wherein in the set application management entry, the application freezing period is equal to k times the basic freezing control period, and the latest unfreezing moment is the last reached basic unfreezing moment, k being an integer greater than or equal to 1.

5. The method of claim 3, wherein the freezing condition comprises:
the application being not an application in a freezing protection database, and the application being running in a background, wherein the freezing protection database stores applications which do not require freezing processing.

6. The method of claim 2, wherein the application freezing period of the application is equal to n times the basic freezing control period, n being an integer greater than or equal to 1.

7. The method of claim 6, further comprising:
setting an application management entry in the application management database for a newly added application in response to detecting that the newly added application is being started up and has no corresponding application management entry in the application management database, wherein in the set application management entry, the application freezing period is equal to k times the basic freezing control period, and the latest unfreezing moment is the last reached basic unfreezing moment, k being an integer greater than or equal to 1.

8. The method of claim 6, wherein the freezing condition comprises:
the application being not an application in a freezing protection database, and the application being running in a background, wherein the freezing protection database stores applications which do not require freezing processing.

9. The method of claim 2, further comprising:
setting an application management entry in the application management database for a newly added application in response to detecting that the newly added application is being started up and has no corresponding application management entry in the application management database, wherein in the set application management entry, the application freezing period is equal to k times the basic freezing control period, and the latest unfreezing moment is the last reached basic unfreezing moment, k being an integer greater than or equal to 1.

10. The method of claim 9, further comprising:
in response to detecting that an application freezing period update condition for the application is satisfied, updating the application freezing period of the application in the application management entry corresponding to the application.

11. The method of claim 2, wherein the freezing condition comprises:
the application being not an application in a freezing protection database, and the application being running in a background, wherein the freezing protection database stores applications which do not require freezing processing.

12. The method of claim 1, wherein the m application freezing periods are application freezing periods in which the application keeps running in a background.

13. The method of claim 1, wherein updating the application freezing period of the application in an application management entry corresponding to the application comprises:
increasing the application freezing period of the application in response to Pw of the application being greater than or equal to Pmax; and
decreasing the application freezing period of the application in response to Pw of the application being less than or equal to Pmin.

14. The method of claim 13, when increasing the application freezing period of the application or after increasing the application freezing period of the application, the method further comprising:
in response to determining that the increased application freezing period is greater than a preset maximum application freezing period, setting the application freezing period of the application to the maximum application freezing period; and
when decreasing the freezing period of the application or after decreasing the application freezing period of the application, the method further comprising:
in response to determining that the decreased application freezing period is less than a preset minimum application freezing period, setting the application freezing period of the application to the minimum application freezing period.

15. The method of claim 1, wherein the freezing condition comprises:
the application being not in a freezing protection database, and the application being running in a background, wherein the freezing protection database stores applications which do not require freezing processing.

16. An application freezing control device, comprising:
a control module configured to unfreeze, in response to a basic unfreezing moment in a basic freezing control period being reached, an application which is in a frozen state and meets an unfreezing condition;
freeze, in response to a basic freezing moment in the basic freezing control period being reached, an application which is in an unfrozen state and meets a freezing condition;
determine, according to a power consumption of the application in a running process, whether an application freezing period of the application is to be updated, and update the application freezing period of the application, in response to an average power consumption value Pw of the application in previous m application freezing periods being greater than or equal to a preset maximum power consumption threshold Pmax; or
update the application freezing period of the application, in response to the average power consumption value Pw of the application in the previous m application freezing periods being less than or equal to a preset minimum power consumption threshold Pmin,
wherein m is an integer greater than or equal to 2.

17. A terminal device, comprising:
a processor;
a memory storing a computer program; and
a communication bus configured to connect the processor and the memory;
wherein the processor is configured to execute a computer program to implement an application freezing control method applicable to a terminal device, comprising:
unfreezing, in response to a basic unfreezing moment in a basic freezing control period being reached, an application which is in a frozen state and meets an unfreezing condition;
freezing, in response to a basic freezing moment in the basic freezing control period being reached, the application which is in an unfrozen state and meets a freezing condition;

determining, according to a power consumption of the application in a running process, whether an application freezing period of the application is to be updated; and updating the application freezing period of the application, in response to an average power consumption value Pw of the application in previous m application freezing periods being greater than or equal to a preset maximum power consumption threshold Pmax; or updating the application freezing period of the application, in response to the average power consumption value Pw of the application in the previous m application freezing periods being less than or equal to a preset minimum power consumption threshold Pmin, wherein m is an integer greater than or equal to 2.

18. A non-transitory computer-readable storage medium storing at least one computer program executable by at least one processor to implement an application freezing control method applicable to a terminal device, comprising:

unfreezing, in response to a basic unfreezing moment in a basic freezing control period being reached, an application which is in a frozen state and meets an unfreezing condition;

freezing, in response to a basic freezing moment in the basic freezing control period being reached, the application which is in an unfrozen state and meets a freezing condition; and, determining, according to a power consumption of the application in a running process, whether an application freezing period of the application is to be updated; and updating the application freezing period of the application, in response to an average power consumption value Pw of the application in previous m application freezing periods being greater than or equal to a preset maximum power consumption threshold Pmax; or updating the application freezing period of the application, in response to the average power consumption value Pw of the application in the previous m application freezing periods being less than or equal to a preset minimum power consumption threshold Pmin, wherein m is an integer greater than or equal to 2.

* * * * *